Jan. 24, 1961 H. N. SHAW 2,969,218
VALVE
Filed June 22, 1956 2 Sheets-Sheet 1

INVENTOR.
Harry N. Shaw
BY
Atty.

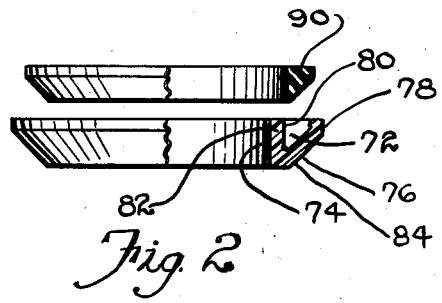
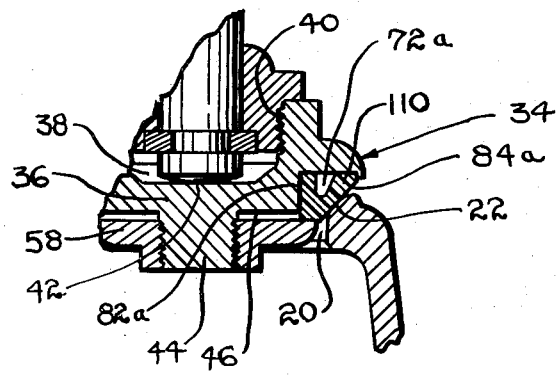
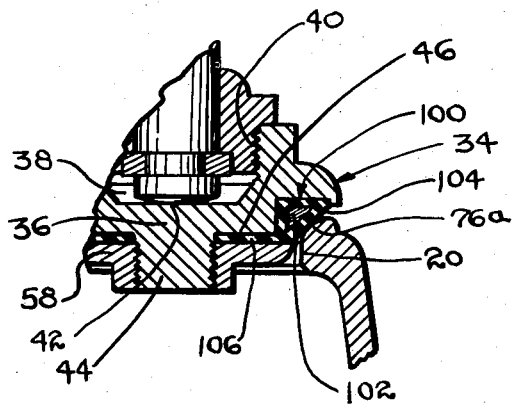
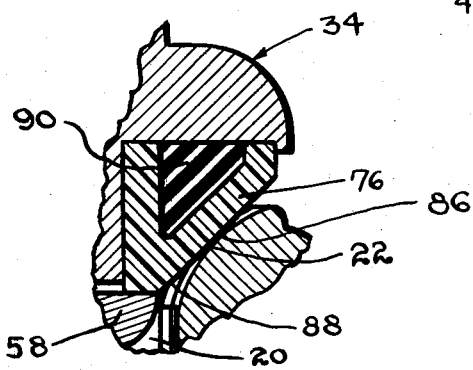

United States Patent Office 2,969,218
Patented Jan. 24, 1961

2,969,218

VALVE

Harry N. Shaw, Mount Prospect, Ill., assignor to The Bastian-Blessing Company, Chicago, Ill., a corporation of Illinois Filed June 22, 1956, Ser. No. 593,109

6 Claims. (Cl. 251—333)

This invention relates to shut-off valves and more particularly to an improved valve seat for handling a wide range of fluids under high-pressure.

One of the problems in valve mechanisms for use in high-pressure valves is to provide a valve seat which will be sufficiently tough for wrench closing, yet have a suitable amount of resilience and a smooth closing surface so that it will both accommodate tolerances in the valve structure under heavy closing pressures and will hold its shape after being subjected to such closing pressures repeatedly.

It has been found that nylon provides the resistance to cold flow which is desirable to maintain the effectiveness of the valve when used as a seat against a shaped valve port surface. However, previous attempts to use this material have met with some difficulty in that the solid and liquid phase temperatures for the nylon are substantially identical so that the hardening process in molding the seat takes place very rapidly with some consequent distortion in the final product.

It is, therefore, an object of the present invention to provide a nylon valve seat wherein the thickness of the nylon body is substantially uniform throughout its shape. Preferably, a hollow cored construction is provided so that the seat can be molded with heat negligible distortion. This provides a smoothness of contact and resiliency of the working walls of the valve seat under closing pressures.

Another object of the invention is to provide an integral nylon valve seat of hollow-cored construction with the core parting line enclosed when in use so that the flashing produced by the coring operation is kept away from the path of fluid flow through the valve.

Another object is to provide a valve seat carrier construction affording support for the lateral walls of the hollow-cored nylon seat to prevent buckling under pressure.

Another object of the invention is to provide a nylon valve seat which is of greater overall thickness in accordance with the essential concept of the invention, and wherein a peripheral V-shaped groove is formed therein for added resilience and effectiveness in sealing, it being desirable to control the resiliency by an insert of either a solid or a fluid material.

Another object is to provide valve means for use with a peripherally grooved valve seat in which the valve opening for receiving the valve seat is rounded for full sealing cooperation with the seat.

Another object is to provide a cross-sectional configuration of the valve seat wherein one of the legs defining the peripheral valve seat groove is relatively slightly elongated relative to the other and the valve seat conforms with the rounded valve opening over a relatively large area of engagement.

Another object is to provide a peripherally grooved valve seat as described which will not develop undesirable hardness and rigidity and which, therefore, will continue to provide effective sealing action over a very considerable period of use.

Other objects and advantages of the invention will appear from the following description taken in connection with the accompanying drawings, in which:

Fig. 2 is an enlarged exploded sectional view of the valve seat shown in Fig. 1;

Fig. 3 is an enlarged fragmentary sectional view of the embodiment of the valve seat shown in Fig. 1;

Fig. 4 is a view similar to Fig. 1 showing another embodiment of the invention; and Fig. 5 is a view similar to Fig. 1 showing another embodiment of the invention.

Figure 1:
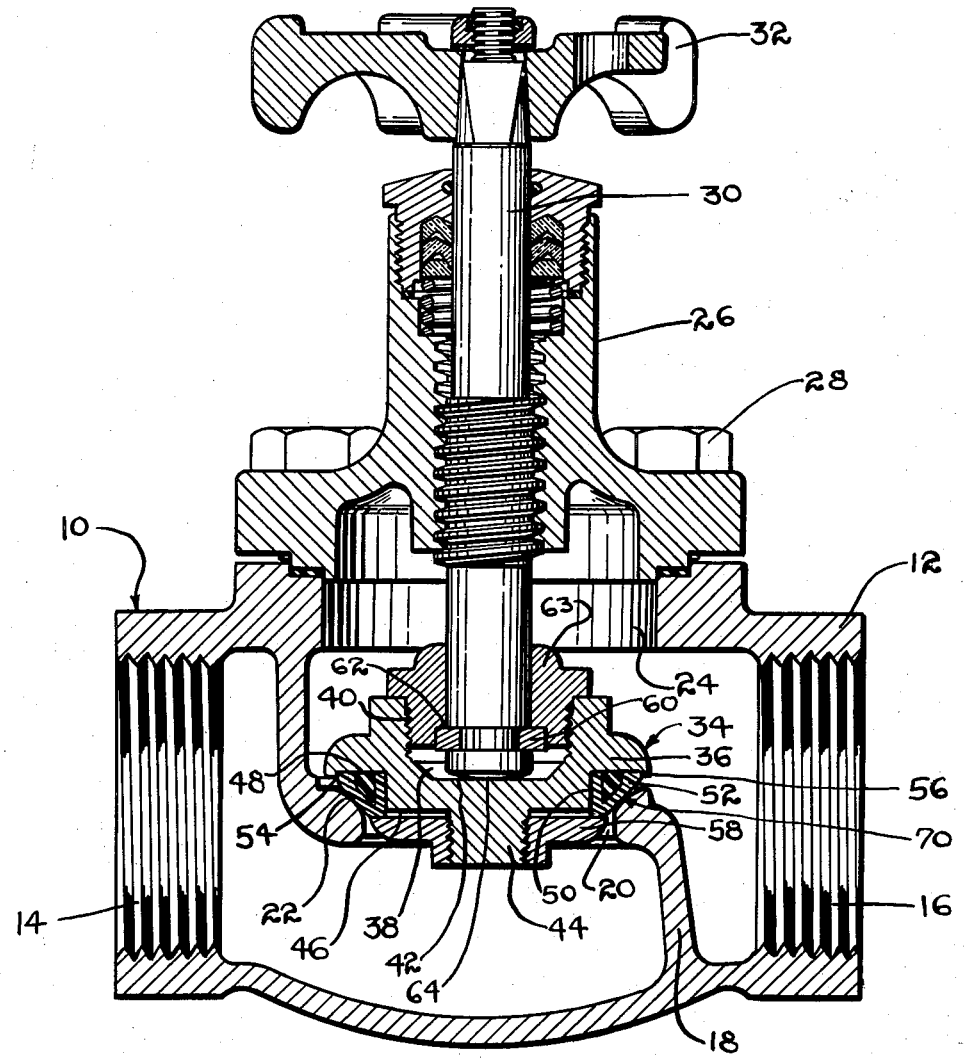
Fig. 1 is a sectional view of a preferred valve seat construction of nylon embodying the invention.

In dispensing gases under high pressure, it is desirable to use a valve seat of comparatively hard material, for the reason that the high pressure of the gas requires considerable closing force to be applied on the valve to close the same tight enough to prevent leakage. These forces tend to distort the valve seat permanently, or the valve port, or both, when wrench-tightened as they often are in field use, unless some resiliency is present in the parts or employed in one of the elements of the valve construction.

Some materials such as elastomers cannot be used safely with certain gases because of the ready oxidation produced and the fact that hard elastomers are frequently subject to sulphur blooming and scuffing. Again, Bakelite is so hard that at high pressures it can distort or flatten the valve port if this is made of brass, as is sometimes the case, particularly under wrench closing pressures. If sulphide gases are dispensed, or their flow regulated, it has heretofore been considered necessary to employ chemically pure zinc as the valve seat material.

Under certain other conditions, if the gas is to be dispensed at an elevated temperature, then at such temperatures valve seats of rubber or certain thermo-plastics will become soft and the distortion on closing the valve will be such as to render the seat unsuited for continued use.

Sometimes the conditions are reversed and the temperatures are so low that hard rubber or certain plastics materials cannot be used because they become hard and brittle which, with wrench closings, will cause a crumbling of the material, particularly if the gas handled is carbon dioxide. Again, in the type of valve employing diaphragms as seals which are flexed for operating the valve, it is necessary that the valve head, plunger or movable portion of the valve that is operated by the flexing of the diaphragm have a predetermined movement, as otherwise the diaphragm may be ruptured in closing the valve. For that reason, material having a low resistance to cold flow and creep cannot be used for valve seats in valves having limited movement because if the valve seat has a low resistance to cold flow, the valve head will in a short time reach its limit of closing movement and the diaphragm may be ruptured and the parts dislocated.

A valve seat of universal application should be of a material that is firm at all expected working pressures to be applied to it and at all temperatures of ordinary use; but not so hard at low temperatures as to cause shattering or cracking and powdering of the valve seat and not so soft under high temperatures as to be easily distorted. Such valve seats should be non-inflammable, have a high resistance to distortion, creep and cold flow, and should be chemically neutral to all of the gases with which the valve is used. Some materials possess some of these characteristics and others have certain other of the characteristics but no material heretofore used has all of the desired characteristics, not even nylon. However, the valve seat of the present invention not only fulfills the requirements of the long-sought-for valve seat for all types of use, but can be molded to provide a particularly smooth outer surface which is neither too hard nor too brittle, and although in the embodiments disclosed, full closure may be accomplished with light pressures, nevertheless, the seat is not injured even if wrenching pressures are imposed.

The nylon valve seat of the present invention has a hollow-cored construction which reduces the wall thickness of the seat relative to its overall dimensions. When the nylon of which the valve is made hardens in the molding process, as happens very quickly, the amount of distortion produced is therefore minimized.

The material employed is a synthetic fibre forming polymeric amide having a protein-like chemical structure characterized by extreme toughness and strength and the peculiar ability to be formed into fibers and into various shapes, and nylon is a generic chemical term including several compounds, having a high melting point (about 473° F.) and a high specific heat.

The valve seat of the present invention may also be usefully employed with refrigerants such as Freon 12 dichlorodifluoromethane $C_{12}F_2$ and other refrigerants, carbon dioxide, air, hydrogen and liquefied petroleum gas, as well as sulphide gases. Hydrogen sulphide has been undergoing tests against the seat for over three months, at the end of which time the seats are still in good condition. It was found that nylon, contrary to expectation in view of the fact that other synthetic resins are more or less flammable, does not burn when used as a valve seat in dispensing oxygen and at high pressures even though the gas may be turned on suddenly in considerable volume, whereas the following compositions burn under like conditions: hard rubber, Saran (a thermal plastic resin), Bakelite (a synthetic resin used for general purpose molding), and polymerized vinyl chloride. Most of these materials are plastic at high temperatures.

Moreover, nylon is the only thermal plastic which, with little or no filler, when used as a valve seat material, does not deform to relieve internal stresses that otherwise cause a high magnitude of cold flow and creep when the valve is closed under high pressure.

Nylon is resistant to oils, greases, esters, ketones, alkalis, alcohols, common solvents and weak acids. It is affected by phenol formic acid and concentrated mineral acids. But some of its most surprising qualities and some of their highly desirable characteristics as regards use in valves or valve seats are a high initial resiliency, extreme firmness after any heavy initial forming pressures, greater capacity for absorbing foreign particles and great resistance to creep and cold flow at various temperatures below 25° F. or 300° F., and under high pressures. Under an initial load of 1500 pounds, for example, it was found that nylon had a sustained high resistance, nylon, in fact, remaining substantially in its initial shape over a period of about twenty minutes. However, both hard rubber and white metal deformed to a considerable extent at the end of ten minutes. Under a load application of 4000 pounds, the resistance to cold flow of nylon was much greater than hard rubber, far superior to white metal. However, the extreme hardness of aluminum and Bakelite resulted in an objectionable deformation of the valve port which was a difficulty entirely lacking with nylon. Nylon also has penetration resistance of an extent equal to aluminum and greater than any of the other materials suitable for valves except Bakelite, which was so hard that, as stated, it deformed the valve port.

Referring now to Fig. 1, the reference character 10 designates a valve of the hand shut-off type having a hollow body 12 having an inlet 14 and outlet 16 separated from each other by a cross wall 18 having an opening 20 through a horizontal portion thereof bordered by valve port 22 facing upwardly and having a smoothly rounded edge or land as shown. Access for machining the port to the contour shown is provided by a circular opening 24 in the top of the body and this opening is closed by a bonnet assembly 26 secured to the body by screws 28 and carrying a valve stem 30 driven by a hand wheel 32 and driving a valve seat assembly 34 at the bottom end thereof to cooperate with the valve port 22.

The valve seat assembly includes a carrier body 36 recessed on top as at 38 to provide a female thread on the side walls 40 thereof and a bearing surface 42 at the bottom thereof. The bottom of the carrier body has an integral depending stud 44 bounded at its base by a flat surface 46 bounded by a seal receiving groove 48. The groove is defined by three machined walls, an inner cylindrical wall 50, a downwardly facing annular wall 52 and an inwardly facing outer wall 54 on a depending flange 56.

A seal, several embodiments of which will soon be described, is received in the groove 48 as held in place by a flange nut 58 threaded on the stud 44 and the carrier body 36 is rotatably mounted on the lower end of the valve stem 30 by means of split washer 60 received in a circumferential groove 62 on the stem as held in place by a gland nut 63 encompassing same as threaded into the walls 40. The lower end face 64 of the stem engages the bottom 42 of the recess 38 to exert valve closing pressures between the valve seat and the valve port. Thus when the hand wheel is turned for opening, the washer 60 operates to lift the valve seal from the valve seat, and when turned for closing, the end of the valve stem drives the valve seal against the valve seat. In both instances, the stem rotates but the valve seal need only move rectilinearly.

The valve seal 70 shown in Figs. 1, 2 and 3 is one in which the general form is a ring having a groove 72 in the top thereof. The inner wall 74 is cylindrical to the extent permitted by the draft of the molding dies, and the working face 76 is frusto-conical terminating upwardly in a marginal cylindrical portion 78. The inner wall 74 slips snugly over the surface 50 on the carrier and the outer cylindrical portion 78 is received snugly within the flange 56.

Preferably, the upper ends of the walls 74 and 78 are coplanar and the back is cored out as at 80 to provide the groove 72 with surfaces spaced from and following the contour of the outer surfaces. The thicknesses of the walls 82 and 84 thus defined is approximately one-third the length of the seal.

With the embodiment shown in Figs. 1, 2 and 3, an elastomer insert 90 of a size and shape slightly larger than the groove is placed in the groove 72 and when the seal is assembled in place with the flanged nut 58 tightened into place, the rubber is placed under compression.

In this embodiment, when the rounded edge or land surface 22 is pressed against the conical wall 76, as indicated at 86, the rubber 90 serves as a substantially incompressible deformable material exhibiting some of the properties of a liquid as when placed under a compressive force it thereby tends to bulge the remaining portion of the conical wall outwardly, particularly within the confines of the port. But with the valve closed, the upstream pressure of the fluid controlled by the valve opposes this bulging and serves as a source of pressure to drive the rubber back, as at 88, to maintain tight closure at all times, thereby resisting any tendency of the valve to open under cold flow conditions of long duration which has otherwise occurred in the past with conventional seals. The counter pressure exerted by the contained fluid is proportional to the pressure controlled and through the liquid medium of the rubber insert maintains closure against creep or cold flow.

The embodiment 100 shown in Fig. 4 is one in which a sectionally triangularly shaped steel insert 102 is embedded in a Buna N ring seal 104. In this embodiment the material is preferably softer than nylon so that it will permit substantial deformation at the surface 76a with a resilient effect greater than that locally occurring due to the fact that the metal insert moves to compress the remaining resilient walls to store energy for maintaining closure of the valve in which the pressure of the contained fluid also tends to compress the rubber below the valve port contact into the angle between the rounded port, and the conical surface of the metal insert. In this embodiment a radial flange 106 is provided at the bottom to be compressed in securing relationship between the face 46 of the carrier 36 and the flanged nut 58.

The embodiment shown in Fig. 5 comprises a nylon seat 110 wherein the groove 72a is modified so that the wall 84a tapers to the circular line, or bottom of the groove, directly behind the point of contact with the valve port edge 22. Also, in this embodiment, the inner wall 82a extends above the upper limit of the outer wall 84a approximately .015".

Thus the tightening of the gland or retainer nut 58 places the heavy axial compression of the nut upon the inner wall, leaving the outer wall somewhat free of compressive forces so that it can yield resiliently under closure forces somewhat to develop a recovery characteristic that maintains a closure seal even if some cold flow occurrs under long closure periods, the compression on the inner wall assisting this by placing the nylon body at the critical contact area under some stress to start with.

Thus it will be observed how the objects of the invention are attained and how nylon with very little resiliency can be utilized to maintain closure of a valve under all conditions and changes of temperatures to which the valve would be exposed without necessitating any change in valve designs which might otherwise be necessitated for different materials that might be used in making the valve ports for reasons of chemistry and metallurgy.

Consequently, having thus described the several embodiments shown and their various characteristics and manner of operation, it will be apparent to those skilled in the art how various and further modifications and changes can be made without departing from the spirit of the invention, the scope of which is commensurate with the appended claims.

What is claimed is:

1. A valve head comprising a nylon ring having a circular inner wall and a tapering annular side wall integrally formed therewith, said inner wall and side wall defining a hollow core between them to afford resiliency in said side wall, and a resilient elastomer ring filling said hollow core of a volume greater than the volume of said core when said side wall is unstressed, and means clamping said rings together and expanding said core volume to that of the elastomer ring by stressing said side wall outwardly.

2. A valve head assembly for use in a valve comprising a metal retaining assembly having a cylindrical wall bounded by axially spaced radial walls defining an annular recess, and a hollow cored nylon ring in said recess having a central wall and an outer wall diverging therefrom and extending from one radial wall to the other radial wall and defining a valve seat engaging surface tapering from said other radial wall, said other radial wall and said diverging and central walls defining an annular space within them of predetermined volume, an incompressible resilient means in said space of a volume greater than said predetermined volume, said axially spaced walls confining the resilient means within said space and stressing said nylon ring by expanding said predetermined volume to that of said resilient means.

3. In a valve for use in dispensing fluids having a body portion with a passage therethrough enlarged to form a valve chamber beyond a rounded tapered land defining a port opening into the chamber and having an outlet therefrom, a valve member adjustably mounted in said chamber, a nylon ring carried by said valve member to close against said land and having a thick circular wall with a tapering land contacting face and an annular groove of predetermined volume behind said face defining a recess therein for determining the thickness of the wall behind the contact area of the face, a substantially incompressible, deformable member in said groove of a volume greater than said predetermined volume, and means confining the solid fluid member within the groove and stressing the ring by expanding said predetermined volume to that of the solid fluid member.

4. In a valve for use in dispensing fluids having a body portion with a passage therethrough enlarged to form a valve chamber beyond a valve seat defining an opening leading into said chamber and a valve head mounted in said chamber for movement towards and away from the valve seat, a valve ring on the head having diverging walls defining an annular hollow core of predetermined volume, one of said walls defining a tapering valve seat engaging surface thereat for engagement with said valve seat, incompressible elastomer means filling said core and having a resiliency different from that of the material of which the valve seat is made and of a volume greater than said predetermined volume, and means confining the elastomer means within said core and stressing the ring by expanding said predetermined volume to that of said elastomer means.

5. A valve for use in dispensing fluids under pressure comprising a body portion having a passage therethrough enlarged to form a valve chamber beyond a valve seat comprising a land defining a central opening therethrough, a valve stem supported on the body in rotatable sealed relationship therewith in axial alignment with said land, a valve head assembly rotatably mounted on said valve stem and including a nylon valve seal having an annular inner wall and a tapering outer wall defining between a space of predetermined volume and an external surface of said outer wall for engaging said land, and an incompressible resilient means disposed in said space of a volume greater than said predetermined volume, said valve head assembly including means confining said resilient means within said space and stressing the valve seal by expanding said predetermined volume to that of the resilient means.

6. A valve head comprising a ring having a hollow core of predetermined volume defined in part by a resilient wall for engaging a valve seat, and a substantially incompressible, deformable element filling said hollow core of a volume greater than said predetermined volume, and means confining said liquid element within said hollow core and stressing the ring by expanding said predetermined volume to that of the liquid element.

References Cited in the file of this patent

UNITED STATES PATENTS

| | | |
|---|---|---|
| Re. 24,440 | Groen | Mar. 4, 1958 |
| 1,733,180 | Biedermann | Oct. 29, 1929 |
| 1,861,420 | Mahan | May 31, 1932 |
| 1,875,438 | Gabriels, Jr. | Sept. 6, 1932 |
| 2,223,651 | White et al. | Dec. 3, 1940 |
| 2,298,632 | Thorner | Oct. 13, 1942 |
| 2,360,734 | Smith | Oct. 17, 1944 |
| 2,457,492 | Raybould | Dec. 28, 1948 |
| 2,646,246 | Tucci | July 21, 1953 |
| 2,726,006 | Brewer | Dec. 6, 1955 |